US008938259B2

United States Patent
Alles et al.

(10) Patent No.: US 8,938,259 B2
(45) Date of Patent: *Jan. 20, 2015

(54) SYSTEM AND METHOD FOR MOBILE LOCATION BY DYNAMIC CLUSTERING

(71) Applicant: Andrew LLC, Hickory, NC (US)

(72) Inventors: Martin Alles, Vienna, VA (US); Thomas B. Gravely, Herndon, VA (US); Khalid W. Al-Mufti, Sterling, VA (US)

(73) Assignee: Andrew, LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/013,329

(22) Filed: Aug. 29, 2013

(65) Prior Publication Data

US 2014/0004881 A1    Jan. 2, 2014

Related U.S. Application Data

(63) Continuation of application No. 13/396,172, filed on Feb. 14, 2012, now Pat. No. 8,526,968.

(60) Provisional application No. 61/442,363, filed on Feb. 14, 2011.

(51) Int. Cl.
*H04W 64/00*     (2009.01)
*H04W 4/02*     (2009.01)
*G01S 5/02*     (2010.01)

(52) U.S. Cl.
CPC .............. *H04W 4/025* (2013.01); *G01S 5/021* (2013.01); *G01S 5/0252* (2013.01); *H04W 64/00* (2013.01)
USPC ...................... 455/456.1; 455/456.6; 370/328

(58) Field of Classification Search
USPC ............. 455/456.1, 452.1, 456.6, 422.1, 522, 455/67.11; 370/328
See application file for complete search history.

(56) References Cited

U.S. PATENT DOCUMENTS

2010/0056178 A1*   3/2010   Kreher et al. ............... 455/456.1
2011/0136496 A1*   6/2011   Klang et al. ................ 455/452.1

* cited by examiner

*Primary Examiner* — Phuoc H Doan
(74) *Attorney, Agent, or Firm* — Duane Morris, LLP

(57) ABSTRACT

A system and method for determining the location of a mobile device in a communications network. A set of network measurement reports (NMR) may be provided for a region in the network. NMRs in the first set may be clustered as a function of observed measurement information in the NMRs. A candidate NMR for a mobile device may be received, and the candidate NMR may then be associated with a selected cluster of NMRs. The candidate NMR and a second set of NMRs may then be clustered, and a location of the mobile device determined as a function of the clustered candidate NMR and second set of NMRs, where the NMRs in the second set are associated with the selected cluster.

17 Claims, 8 Drawing Sheets

SYSTEM AND METHOD FOR MOBILE LOCATION BY DYNAMIC CLUSTERING

CROSS REFERENCES

The present application is a continuation of U.S. application Ser. No. 13/396,172 entitled "System and Method for Mobile Location by Dynamic Clustering", filed on 14 Feb. 2012, which itself claims the priority benefit of U.S. Provisional Application Ser. No. 61/442,363 entitled "Mobile Location by Dynamic Clustering", filed on 14 Feb. 2011, the entirety of each of which are incorporated herein by reference.

BACKGROUND

The present disclosure is generally directed towards a system and method for estimating the location of a wireless mobile device that is in communication with a wireless communications network. More specifically, the disclosure relates to the problem of estimating the location of a wireless mobile device using information from one or more Network Measurement Reports ("NMRs") which may be generated by a wireless communications network or the mobile device.

As is well known in the art, the use of wireless communication devices such as telephones, pagers, personal digital assistants, laptop computers, anti-theft devices, etc., hereinafter referred to collectively as "mobile devices", has become prevalent in today's society. Along with the proliferation of these mobile devices is the safety concern associated with the need to locate the mobile device, for example in an emergency situation. For example, the Federal Communication Commission ("FCC") has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911). In addition to E911 emergency related issues, there has been increased interest in technology which can determine the geographic position, or "geolocate" a mobile device. For example, wireless telecommunications providers are developing location-enabled services for their subscribers including roadside assistance, turn-by-turn driving directions, concierge services, location-specific billing rates and location-specific advertising.

Currently in the art, there are a number of different ways to geolocate a mobile device. For example, providers of wireless communication services have installed mobile device location capabilities into their networks. In operation, these network overlay location systems take measurements on radio frequency ("RF") transmissions from mobile devices at base station locations surrounding the mobile device and estimate the location of the mobile device with respect to the base stations. Because the geographic location of the base stations is known, the determination of the location of the mobile device with respect to the base station permits the geographic location of the mobile device to be determined. The RF measurements of the transmitted signal at the base stations can include the time of arrival, the angle of arrival, the signal power, or the unique/repeatable radio propagation path (radio fingerprinting) derivable features. In addition, the geolocation systems can also use collateral information, e.g., information other than that derived for the RF measurement to assist in the geolocation of the mobile device, i.e., location of roads, dead-reckoning, topography, map matching, etc.

In a network-based geolocation system, the mobile device to be located is typically identified and radio channel assignments determined by (a) monitoring the control information transmitted on radio channel for telephone calls being placed by the mobile device or on a wireline interface to detect calls of interest, i.e., 911, (b) a location request provided by a non-mobile device source, i.e., an enhanced services provider. Once a mobile device to be located has been identified and radio channel assignments determined, the location determining system is first tasked to determine the geolocation of the mobile device and then directed to report the determined position to the requesting entity or enhanced services provider.

The monitoring of the RF transmissions from the mobile device or wireline interfaces to identify calls of interest is known as "tipping", and generally involves recognizing a call of interest being made from a mobile device and collecting the call setup information. Once the mobile device is identified and the call setup information is collected, the location determining system can be tasked to geolocate the mobile device.

While the above-described systems are useful in certain situations, there is a need to streamline the process in order to efficiently and effectively handle the vast amount of data being sent between the wireless communications network and the large number of mobile devices for which locations are to be determined. In this regard, embodiments of the present subject matter may overcome the limitations of the prior art by estimating the location of a wireless mobile device using Network Measurement Reports ("NMRs") which include calibration data for a number of locations within a geographic region. An NMR may be, in one embodiment, a vector of measurement observations. Embodiments of the present subject matter may provide an accurate location of a mobile device using a variety of observations, measured at the mobile or by the network in relation to the mobile. Exemplary pattern matching schemes may employ these observations and/or associate such observations with a database containing previously made observations to determine a location of a mobile device. Exemplary pattern matching schemes may be provided with one or more NMRs or a set of such measurements associated with a mobile device at its unknown location, a calibration database containing previously obtained measurements or predicted measurements indexed to location.

One conventional method of location estimation utilizing NMRs is to compare an NMR from a target mobile device with calibration vectors in a respective measurement database, determine the closest NMR (using some metric), and assign the location of the closest NMR as the location of the NMR for the target mobile device. Such a method, however, provides unacceptable errors, especially when the NMRs contain power measurements as there may be a large variability in these measurements to reliably locate the target mobile device. Hence, some form of averaging is often desired. Another conventional method of location estimation utilizing NMRs may include dividing the location space (e.g., a region S containing all possible location solutions) in some manner into sub-regions $C_i$. Each sub-region $C_i$, may then be associated with a characterizing vector of measurements or a set of attributes. In this conventional method, by averaging multiple NMRs obtained in each such sub-region $C_i$, location accuracy may be improved. U.S. Pat. No. 6,496,701 to Chen provides such a technique. This technique is generally referred to as a disjoint partitioning of location space into regions or sub-regions $C_i$. For example, Chen describes an explicit disjoint partitioning of a location region (a cell S) into sub-cells $C_i$ using the following relationship to divide the location space into m disjoint regions:

$$S = \sum_{i=1}^{m} C_i \quad (1)$$

This conventional method of dividing location space is not ideal as there is little chance of obtaining characterizing vectors of observed measurements. For example, considering a user of a mobile device located at a window in a building, the act of the user turning around may result in observed measurements becoming dramatically different from signal loss, etc. Further, in a challenging environment such as an urban canyon, if a user travels five to ten feet, observed measurements may dramatically change due to blockage, multipath and/or reflections from the environment. Thus, the prior art is limited in determining the proper sub-cells or sub-regions $C_i$ in such challenging environments.

Another conventional approach described in U.S. Patent Application Publication No. 20090117907 to Wigren and in the publication entitled, "Adaptive Enhanced Cell-ID Fingerprinting Localization by Clustering of Precise position Measurements," September 2007, by Wigren, groups calibration data by similarity. The resulting groups or clusters are analyzed to generate a most likely polygonal shape in the location space. Further, these groups are made in location space and are groupings of measurements with a specified bin size for each measurement of interest. The polygons are determined as a function of their measurements, and the polygons are then used to specify likely areas or regions where one assigns a location for future measurements. Such an approach, however, is limited in determining an accurate location for a target mobile device in challenging environments.

Therefore, there is a need in the art for a system and method to improve location capabilities of a communications system in such environments. In view of these needs, one embodiment of the present subject matter may disregard the location information or location space and cluster available data, e.g., calibration data in observation space. Thus, in embodiments of the present subject matter, obtained NMRs (or generically, measurement vectors obtained during a collection process such as drive testing or by employing mobile devices in active communication with the communications network) may have one or more measurements coupled to location information. Embodiments of the present subject matter may disregard where the measurements were made and focus on grouping or clustering the measurements by similarity in the observation space using an appropriate parameter or cluster measure. Such groupings may create observation clusters in observation space. The observation clusters or groups generated by embodiments of the present subject matter, however, are not constrained into regions in the location space. That is, observation clusters according to embodiments of the present subject matter do not possess a specific association to sub-cells $C_i$ such as that seen in Chen and are thus fundamentally different from using a pre-specified grid (or division of the location space) and then assigning certain measurements to each such grid point. Further, observation clusters according to embodiments of the present subject matter do not possess a specific association to location dependent polygons such as that seen in the Wigren references and are thus fundamentally different from grouping measurements by similarity and then forcing a most likely polygonal shape in the location space to contain such measurements. Thus, if exemplary observation clusters according to embodiments of the present subject matter were to be examined in the location space, the clusters would appear to form arbitrary associations of points having a connection to each other defined by a similarity of measurements.

Further, embodiments of the present subject matter do not require any association of shapes or points in the location space to observations or measurements.

In one embodiment of the present subject matter, a candidate NMR for a mobile device requiring location determination may be received. In this embodiment, the candidate NMR may be examined against generated observation clusters, and then members of a subset of observation clusters along with the candidate NMR may be clustered again or "re-clustered" in the observation space to provide a location estimate for the target mobile device. Determined locations according to embodiments of the present subject matter are thus not one of a fixed set of pre-determined assignable locations as that in Chen and Wigren; rather, determined locations may be a function of the observed cluster in which the candidate NMR finds itself, that is, a cluster having members with similar observations to that of the candidate NMR.

One embodiment of the present subject matter provides a method of determining the location of a mobile device in a communications network. The method may include generating a first set of NMRs for a region in a communications network and clustering measurement information from the first set of NMRs as a function of a common parameter of the measurement information. A candidate NMR for a mobile device may be received whereby measurement information from the candidate NMR is compared with the clustered measurement information from the first set of NMRs. A location of the mobile device may be determined as a function of the compared measurement information.

Another embodiment of the present subject matter provides a method of determining the location of a mobile device in a communications network. The method includes collecting calibration data for a region in a communications network and providing a first set of measurement vectors in observation space using the collected calibration data. Available measurement information from the first set of vectors may be selected to create clusters based on a common parameter in observation space. A candidate measurement vector for a mobile device may be received whereby measurement information from the candidate vector may be compared with the measurement information from the created clusters. A location of the mobile device may then be determined as a function of the compared measurement information.

A further embodiment of the present subject matter provides a method of determining the location of a mobile device in a communications network. The method may include providing a set of NMRs for a region in the network and clustering NMRs in the first set as a function of observed measurement information in the NMRs. A candidate NMR for a mobile device may be received, and the candidate NMR associated with a selected cluster of NMRs. The candidate NMR and a second set of NMRs may be clustered whereby the NMRs in the second set are associated with the selected cluster. A location of the mobile device may be determined as a function of the clustered candidate NMR and second set of NMRs.

An additional embodiment of the present subject matter provides a method for determining the location of a mobile device in a communications network. The method may include collecting calibration data for a region in the network and providing a set of NMRs using the collected calibration data, each NMR having measurement information. NMRs in the set may be clustered without regard to the location where the measurement information was obtained. A candidate NMR for a target mobile device may be received, and the candidate NMR associated with a selected cluster of NMRs. Measurement information from the candidate NMR may be combined with a second set of NMRs. A location of the mobile device may then be determined in the region as a function of the combined candidate NMR and second set of NMRs.

These and other embodiments of the present subject matter will be readily apparent to one skilled in the art to which the disclosure pertains from a perusal or the claims, the appended drawings, and the following detailed description.

DETAILED DESCRIPTION

Figure 1:
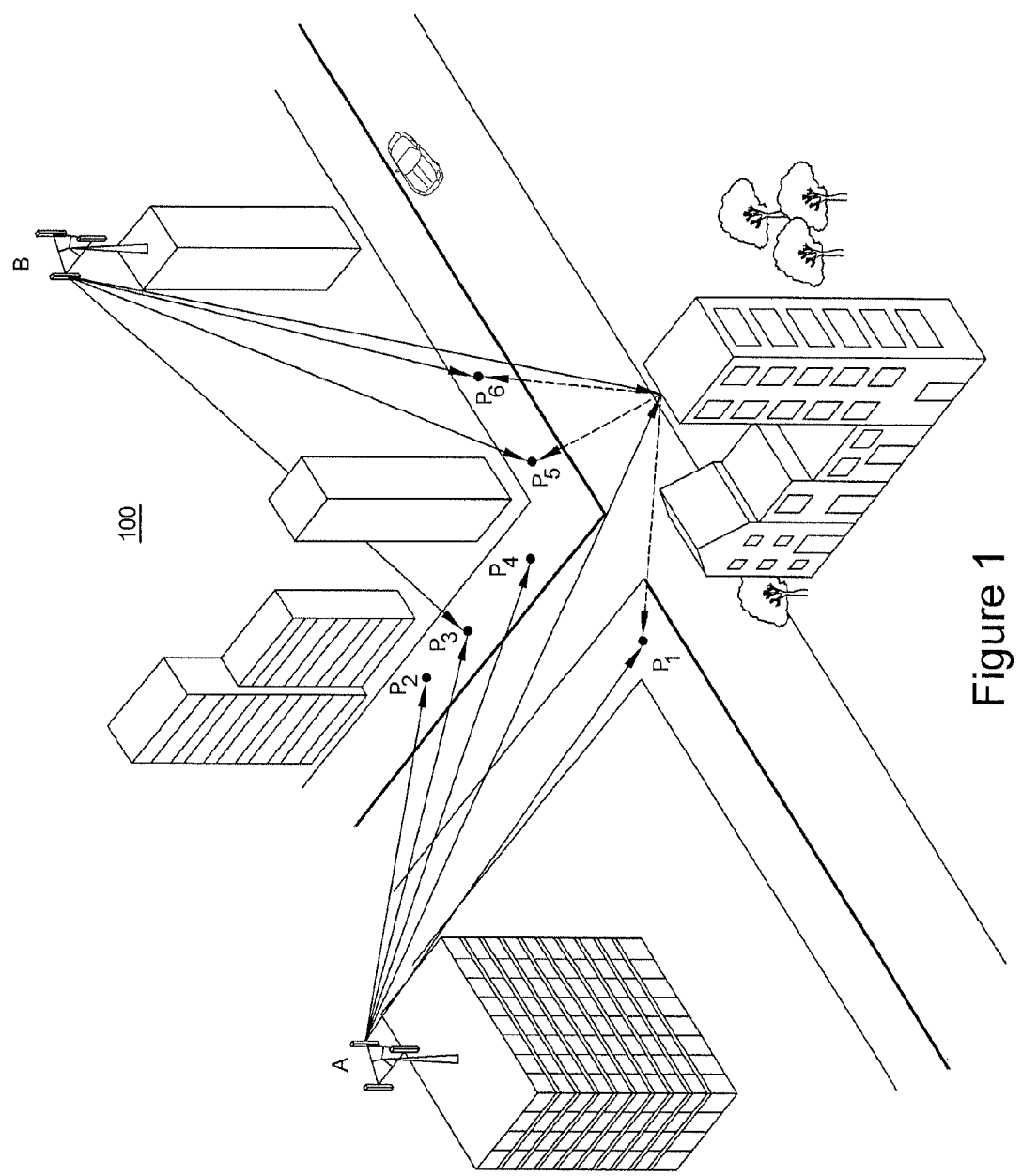
FIG. 1 is a pictorial representation of one embodiment of the present subject matter.

With reference to the figures where like elements have been given like numerical designations to facilitate an understanding of the present subject matter, the various embodiments of a system and method for determining the location of a mobile device by dynamic clustering are described.

A Network Measurement Report (NMR) may be generally defined as a collection of observed measurements and/or information or data obtained at some specific geographic location. It should be noted that the terms information and data are used interchangeably in this disclosure and such use should not limit the scope of the claims appended herewith. An NMR may be a single vector or multiple vectors of observations or observed measurements or may be a single vector representative of multiple vectors. Thus, if a mobile device collects several observation vectors and averages the same, for example, this may also be an exemplary NMR. Exemplary NMR parameters may include, but are not limited to, an ordered list of neighboring cells or elements and/or other signal sources (the ordering may be accomplished using any observable measurement, e.g., power, etc.), absolute neighboring cell power levels, relative neighboring cell power differences, functions defined using absolute neighboring cell power levels, e.g., mean, median, $k^{th}$ moment, cluster-mean, etc., functions defined using relative neighboring cell power differences, e.g., mean, median, $k^{th}$ moment, cluster-mean, etc., serving cell/sector, timing advance (TA) parameter (or equivalent), round trip time (RTT) for a signal between a calibration point and an external known point, Time Difference of Arrival (TDOA) at a calibration point with respect to pairs of external points located within or in proximity to a region as measured by either a receiver at the calibration point or the external points, individual power density function of each neighboring cell power level, joint power density function of neighboring cell power levels, mean and variance of neighboring cell power levels, mobile device orientation (indoors, outdoors, facing North or South, tilted upwards, azimuth, elevation, etc.), network state as reported by the network or as determined by an observer, to name a few.

As previously noted, the NMR may include location information, which in two dimensions may be expressed as $(x_c, y_c)$. Thus, one may envisage an NMR as a tall vector having two lower-most dimensions as the location information if in two dimensions (or if in three dimensions, the three lower-most dimensions as the location information) and other dimensions representing the observed measurements (i.e., "observations"). The types of exemplary parameters in an NMR noted above may also be separated by groups such as, but not limited to, real continuous numbers (e.g., time measurements, power levels, etc.), discrete numbers such as identifiers for neighboring cells (TA parameters, mobile orientation characterizations, network state, etc.), functions representing the variation of a parameter at the NMR location, and ordered lists (e.g., power level ordered list, etc.).

If the full number of dimensions are represented as n and assuming two-dimensional location information, observation space may generally be defined as the space or mathematical space generated by variations of measurements in the first (n−2) dimensions. Location space would then be defined as the space generated by variations in the lower-most two dimensions. Thus, a typical NMR vector M in observation space may be represented as:

$$M = \begin{bmatrix} P_A \\ P_B \\ TA \\ NS \\ O \\ \ldots \\ P_G \end{bmatrix} \quad (2)$$

where $P_A$, $P_B$, etc. represent measured power on transmitters A, B and so forth, O represents an ordering of some subset of observed neighbor cells or transmitters, TA represents a timing advance value, and NS represents the network state.

An exemplary clustering algorithm may generally provide a means to determine the similarity between NMRs. This similarity may be determined in a variety of ways, for example, by employing a similarity measure or a "distance measure." Such a similarity or distance measure may provide one with the "distance" to be applied when comparing two different measurement vectors or NMR vectors such as M in Equation (2). Thus, as the distance measure between two NMRs increases, the similarity decreases and hence the distance provides an indication regarding the similarity or dissimilarity of the NMRs to each other. For example, considering a mapping of real continuous variables (e.g., power levels and time measurements measured on neighboring cells), a distance measure may be determined using the following relationship:

$$d_r = \mu_r \| P_i - P_j \| \quad (3)$$

where $P_i$, $P_j$ represent vectors constructed for the power levels observed for multiple sites, i, j represent two different NMRs, and $\mu_r$ represents a constant scaling factor. More generally, given an NMR i and another NMR j, a distance measure for power may be determined using the relationship:

$$d_P^2(i,j) = \Sigma_{k=1}^n f(P_{i,k}, P_{j,k}) \quad (4)$$

where the power components of each NMR are indexed by k and f(.) represents a function that applies to comparing power levels. A similar relationship may also be applied to time components or other real continuous variables in an exemplary NMR.

In another example, considering a discrete integer variable, such as an integer identifier (e.g., TA parameter, Network State (NS), etc.), a distance measure may be determined using the following relationship:

$$d_{TA}^2(i,j) = g(TA_i, TA_j) \quad (5)$$

where g(.) represents a function that applies to comparing TA values. It follows that in the case of network state (an identifier that captures variations in network settings), a similar distance measure may use the following relationship:

$$d_{NS}^2(i,j) = h(NS_i, NS_j) \quad (6)$$

where $NS_i$ represents the network state for NMR i, $NS_j$ represents the network state for NMR j, and h(.) represents a function that applies to comparing NS values. A similar relationship may also be applied to other identifiers in an exemplary NMR. For example, if the network operates in one of two states where the states differ in the tilt of a single antenna, then the state may be binary (e.g., two possible network states). Thus, the network state may be determined by some means of communication with the network (e.g., information exchange) during collection of calibration data. Network state may also be necessary when a candidate NMR presents itself or is received for location determination.

In another example, considering a function representing the variation of a parameter at an NMR location (e.g., a probability distribution function obtained for a particular variable (received power of a TV station as recorded in the NMR)), a distance measure may be determined using the following relationship:

$$d_f = \mu_f D_f(f_i, f_j) \quad (7)$$

where $D_f(.)$ represents the distance function applied to a comparison of the two functions (one stored in each NMR), and $\mu_f$ represents a constant. Further, in another embodiment, an L1 norm on space of probability measures or the Kullback-Leibler divergence may be used here.

In a further example, considering ordered lists such as a power level ordered list, etc., one embodiment may convert the ordering number to a distance measure. Generally, an ordering number may be indicative of how many relative shifts in position occur between the observations in a first NMR when compared to another NMR. For example, NMR i may possess an ordered label ABCDE for neighboring cell power levels (A, B, C, D, E (denoting sites)) whereas in NMR j the ordering may be BACDE, which evaluates to an ordering number of 1 (i.e., a single shift). Many variations of how the ordering number is determined may be considered but each of them represents a measure of the distortion in order between the neighboring cell power level, in this example, observed in the NMR as compared to the neighboring cell power levels observed in the observations at the candidate point (x, y). In such an example, a distance measure may be determined using the following relationship:

$$d_O(i,j) = q(O_i, O_j) \quad (8)$$

where O refers to the order and q(.) represents a function that applies to the ordered lists, converting the comparison of the order in which certain observations occur into an exemplary distance measure. In another embodiment, another appropriate distance, such as a Levenshtein distance or a Damerau-Levenshtein distance, may be employed whereby these distances may represent a distance between two ordered lists and may be suitable candidates for a distance measure.

In one non-limiting embodiment, considering continuous and discrete measurements (i.e., excluding functions), an exemplary clustering distance measure may be determined using the following relationship:

$$d_{L1}^2(i,j) = d_O(i,j) * d_{NS}(i,j) * (d_P^2(i,j) + d_{TA}^2(i,j)) \quad (9)$$

where i and j each represent an NMR, $d_O(i,j)$ represents a function comparing observed measurements for ordered lists, $d_{NS}(i,j)$ represents a function comparing network states, $d_P^2(i,j)$ represents a function comparing real continuous variables (in this case power), and $d_{TA}^2(i,j)$ represents a function comparing discrete integer variables (in this case TA).

It should be noted that this relationship excludes any (x, y) dimensions, that is, the distance does not concern itself with location but only observed measurements whereby clustering is limited to operations in observation space. More generally, Equation (9) represents a complex function or clustering algorithm assigning a distance (a scalar value) to, in this case, a pair of NMRs having multiple parameters of different types. This clustering algorithm may accept available calibration data (from any or all NMRs, previously obtained or otherwise) and provide a set of observation clusters. These observation clusters represent groupings or sets of measurement information in NMRs, based on the distance measures, in observation space. It should be noted that the terms, group, set, subset and/or cluster are used interchangeably throughout this disclosure, however, such use should not in any way limit the scope of the claims appended herewith. Thus, defining $T_s$ as an initial grouping threshold, $N_{s1}$ as a minimum cluster size, $D_{P1}$ as a cluster requirement on power, $D_{TA1}$ as cluster requirement on TA, $D_{O1}$ as a cluster requirement on ordering, $\{S\}$ as a collection of NMR vectors, $\{S_O\}$ as an outlier subset, $D_{OC1}$ as a distance requirement on the observation clusters, $k_{m1}$ as the maximum number of centers for clustering, SV(.) as a function that extracts a serving site identifier, and $C_i$ as an arbitrary NMR in the calibration data, operation of an exemplary clustering algorithm will be further described.

For example, an arbitrary NMR $C_i$ may be selected at random from $\{S\}$. Next, all or a predetermined number of $C_j$ (e.g., all $C_j \in \{S\}$) should be extracted such that $d_{L1}^2(i,j) < T_s$ and $SV(C_j) = SV(C_i)$. This extraction should then be assigned as $\{S_i\}$. If $|\{S_i\}| < N_{s1}$, then $\{S_i\}$ should be placed in $\{S_O\}$ and the process repeated. If, however, $|\{S_i\}| > N_{s1}$, then $\{S_i\}$ is a valid set for cluster analysis. Employing the previously defined or applicable distance measures, a fast algorithm (e.g., Hamerly's algorithm, etc.) may be used for k-means, and centers in observation space determined as appropriate. To determine the number of centers, the variable k should be incremented starting with k=1 until a cluster Q emerges such that for the elements (i, j) contained in Q, $d_P(i,j) < D_{P1}, d_{TA}(i,j) < D_{TA1}, d_O(i,j) < D_{O1}$, and $|Q| > N_{S1}$. Now Q may be defined as an observation cluster. It should be noted that Q was generated without any location information playing a part therein. That is, Q is not dependent on (x, y) in location space. If, however, k increases to the point such that $k > k_{m1}$, with no formed clusters, then $C_i$ should be placed in $\{S_O\}$ and the other elements of $\{S_i\}$ should be placed back in $\{S\}$ and the entire process repeated. Otherwise, all formed clusters Q should be removed from $\{S\}$, and any residual NMRs in $\{S_i\}$ should be placed back into $\{S\}$. If, however, $|\{S\}| < N_{s1}$ then the residual should be placed in $\{S_O\}$. If, $|\{S\}| > N_{s1}$, then the entire process should be repeated.

Characteristic values and windows may then be assigned for each parameter type in every observation cluster. These exemplary windows generally represent a maximum and minimum allowable deviation from the observation cluster characteristic. Further, the size of these deviations may be determined as a function of the measurements in the observation cluster. For each observation cluster a pointer to the subset of calibration data that generated the respective observation cluster may be maintained.

Upon receipt of a request for a location estimate for mobile device, e.g., a candidate NMR requiring a location estimate, it should be noted that applicable observation clusters have been generated and any NMRs that did not fall into the observation clusters have been rejected and/or placed in an outlier set $\{S_O\}$. Additionally, for each observation cluster and observation cluster parameter, there may also exist a characteristic window. Each parameter in the candidate NMR may then be compared against the corresponding window(s) in each observation cluster. If all parameters in the candidate NMR fit within the windows of a corresponding observation cluster, this observation cluster may be, in one embodiment, selected for dynamic clustering. If a predetermined number of (e.g., at least two) observation clusters are not produced by this exemplary process, the windows may be adjusted until at least two observation clusters are selected. Generally, windows may be determined such that a typical NMR has a predetermined number (e.g., three or more) observation clusters with which to proceed onto additional clustering, e.g., dynamic clustering.

Once the predetermined number of observation clusters have been identified, the calibration data input to each of these observation clusters may be extracted into a set $\{S_d\}$. That is, the data that was previously used to create the observed cluster may now be pulled into the set $\{S_d\}$, and this is repeated for each observation cluster identified by the windowing process. The candidate NMR may now be added to the set $\{S_d\}$, and an additional level of clustering commences.

Defining $T_{s2}$ as an initial grouping threshold, $N_{s2}$ as a minimum cluster size, $D_{P2}$ as a cluster requirement on power, $D_{TA2}$ as cluster requirement on TA, $D_{O2}$ as a cluster requirement on ordering, $\{S'\}$ as a collection of NMR vectors (a subset of $\{S\}$), $\{S_O\}$ as an outlier subset, $D_{OC2}$ as a distance requirement on the observation clusters, $k_{m2}$ as the maximum number of centers for clustering, operation of a further exemplary clustering algorithm will be described and a second level clustering distance provided by:

$$d_{L2}^2(i,j) = d_{O2}(i,j) * d_{NS2}(i,j) * (d_{P2}^2(i,j) + d_{TA2}^2(i,j)) \quad (10)$$

where i and j each represent an NMR, $d_{O2}(i,j)$ represents a function comparing observed measurements for ordered lists, $d_{NS2}(i,j)$ represents a function comparing network states, $d_{P2}^2(i,j)$ represents a function comparing real continuous variables (in this case power), and $d_{TA2}^2(i,j)$ represents a function comparing discrete integer variables (in this case TA). It should be noted that the suffix 2 in terms in Equation (10) generally represent a "tighter" or even an altogether different distance measure used in this second level clustering (or re-clustering) process.

Generally, this second level of clustering is similar to the first clustering process; however, this additional level of clustering may employ different cluster distances and different cluster thresholds, may operate on a subset of the original set $\{S\}$, and may have the candidate NMR, $C_u$, included. Thus, this level of clustering may now be accomplished with the candidate NMR of unknown location and a subset of the original set of calibration vectors. Denoting this subset as $\{S'\}$, it follows that $\{S'\} = \{S_d\} \cup C_u$ whereby the operations for the subsequent clustering process occurs in observation space.

For example, an arbitrary NMR $C_i$ may be selected at random from $\{S'\}$. Next, all or a predetermined number of $C_j$ (e.g., all $C_j \in \{S'\}$) should be extracted such that $d_{L2}^2(i,j) < T_{s2}$ and $SV(C_j) = SV(C_i)$. This extraction should then be assigned as $\{S_i\}$. If $|\{S_i\}| < N_{s2}$, then $\{S_i\}$ should be placed in $\{S_O\}$ and the process repeated. If, however, $|\{S_i\}| > N_{s2}$, then $\{S_i\}$ is a valid set for cluster analysis. Employing new and/or applicable distance measures, a fast algorithm may be used for k-means, and new centers in observation space determined as appropriate. To determine the number of centers, the variable k should be incremented starting with k=1 until a cluster Q emerges such that for the elements (i, j) contained in Q, $d_P(i,j) < D_{P2}, d_{TA}(i,j) < D_{TA2}, d_O(i,j) < D_{O2}$, and $|Q| > N_{S2}$. Now Q is defined as an observation cluster. It should be noted that Q was generated without any location information playing a part therein. That is, Q is not dependent on (x, y) in location space. If, however, k increases to the point such that $k > k_{m2}$, with no formed clusters, then $C_i$ should be placed in $\{S_O\}$ and the other elements of $\{S_i\}$ should be placed back in $\{S'\}$ and the entire process repeated. Otherwise, all formed clusters Q should be removed from $\{S'\}$, and any residual NMRs in $\{Si\}$ should be placed back into $\{S'\}$. If, however, $|\{S'\}| < N_{s2}$ then the residual should be placed in $\{S_O\}$. If, $|\{S'\}| > N_{s2}$, then the entire process should be repeated. It also follows that $C_u$ should not be placed in $\{S_O\}$. After this second clustering, one or more observation clusters may be available whereby the candidate NMR will be present in one of these clusters, as well as a collection of other NMRs.

A location may now be assigned to the candidate NMR by examining the set of NMRs in the cluster having the candidate NMR. For example, a center or centroid of the cluster having the candidate NMR may be determined in observation space and the closest NMR to this center determined, again in observation space. The location information may then be examined for this closest NMR to the center (now accomplished in location space) and this location information applied to the candidate NMR. Of course, such an example should not so limit the scope of the claims appended herewith as many other methods based on the characteristics of the observation cluster having the candidate NMR may be applied. It should be noted that when an exemplary centroid is determined in the observation space, the observations in the candidate NMR contribute to this calculation; thus, as the observations in the candidate NMR change, the centroid in observation space also changes. This is a feature or aspect of the dynamic clustering. In another embodiment, a clustering algorithm may employ subset $\{S'\}$ and use the candidate NMR as a cluster center in creating the formed clusters Q. The location assigned to the candidate NMR may then be derived as a property of the other NMRs contained in the cluster having a center in observation space being the candidate NMR.

In the instance that multiple candidate NMRs are available for location, it may be known a-priori that these multiple NMRs all refer to nearly the same unknown location; thus, these multiple NMRs may be used to form the set $\{S'\}$ where the closest clusters to each candidate are determined and their formative members extracted. Subsequently, an exemplary clustering process detailed herein may be applied. In one embodiment, when the multiple NMRs are in various clusters, a cluster containing the majority of candidate NMRs may be selected and location assignment for the candidate NMR may proceed. Alternatively, clusters containing candidate NMRs may each be treated as identified herein to generate individual locations therefor and these locations can be weighted and averaged in some manner. Such an exemplary, non-limiting weighting may include a fraction of candidates in a particular cluster.

FIG. 1 is a pictorial representation of one embodiment of the present subject matter. With reference to FIG. 1, a typical case of signal reception in a challenging environment 100 (e.g., an urban canyon) is illustrated having two visible cell towers A, B and their respective cell signal transmissions denoted by the same label. Additional cell towers C, D, E, F and their respective signals are not shown in FIG. 1. At certain points in the location space P1, P2, P3, P4, P5, P6 there may exist multiple possible observation vectors (NMRs). For example, at P1 occurring NMRs may be [A, B, C, D, E, F] and [A, C, D, E, F], at P2 occurring NMRs may be [A, C], at P3 occurring NMRs may be [A, B, C] and [A, B], at P4 occurring NMRs may be [A, C], at P5 occurring NMRs may be [B, A, C, D] and [B, C, D], and at P6 occurring NMRs may be [B, A, C] and [B, C]. With reference to P1, P3, P5 and P6, each of these points include valid NMRs occurring at the very same point due to the variable nature of the environment. Thus, a small movement or rotation of a mobile device may alter the signal pattern it sees. It should also be noted that the distances between P2 and P3 or P3 and P4, for example, may be slight, however, the NMRs occurring at these points are different due to the environment. Thus, FIG. 1 provides an illustration of the variability of the observed NMRs and associated measurements in a challenging environment.

Embodiments of the present subject matter, however, may provide locations of mobile devices in such an environment through a focus upon observation space rather than location space, and through subsequent division of the observation space into observation clusters. Conventional techniques (such as those discussed in the Background) that divide up the location space with an expectation that each sub-cell or sub-region may be represented by a single characterizing vector of measurements or attributes may average the varied observations in such a sub-cell and generally result in a poor representation of the actual situation. Such techniques, without regard to whether the division of the location space is accomplished before or after analysis of calibration data, force a particular geometric shape onto the data which fails to adequately capture the variability of dynamic environments.

Figure 2:
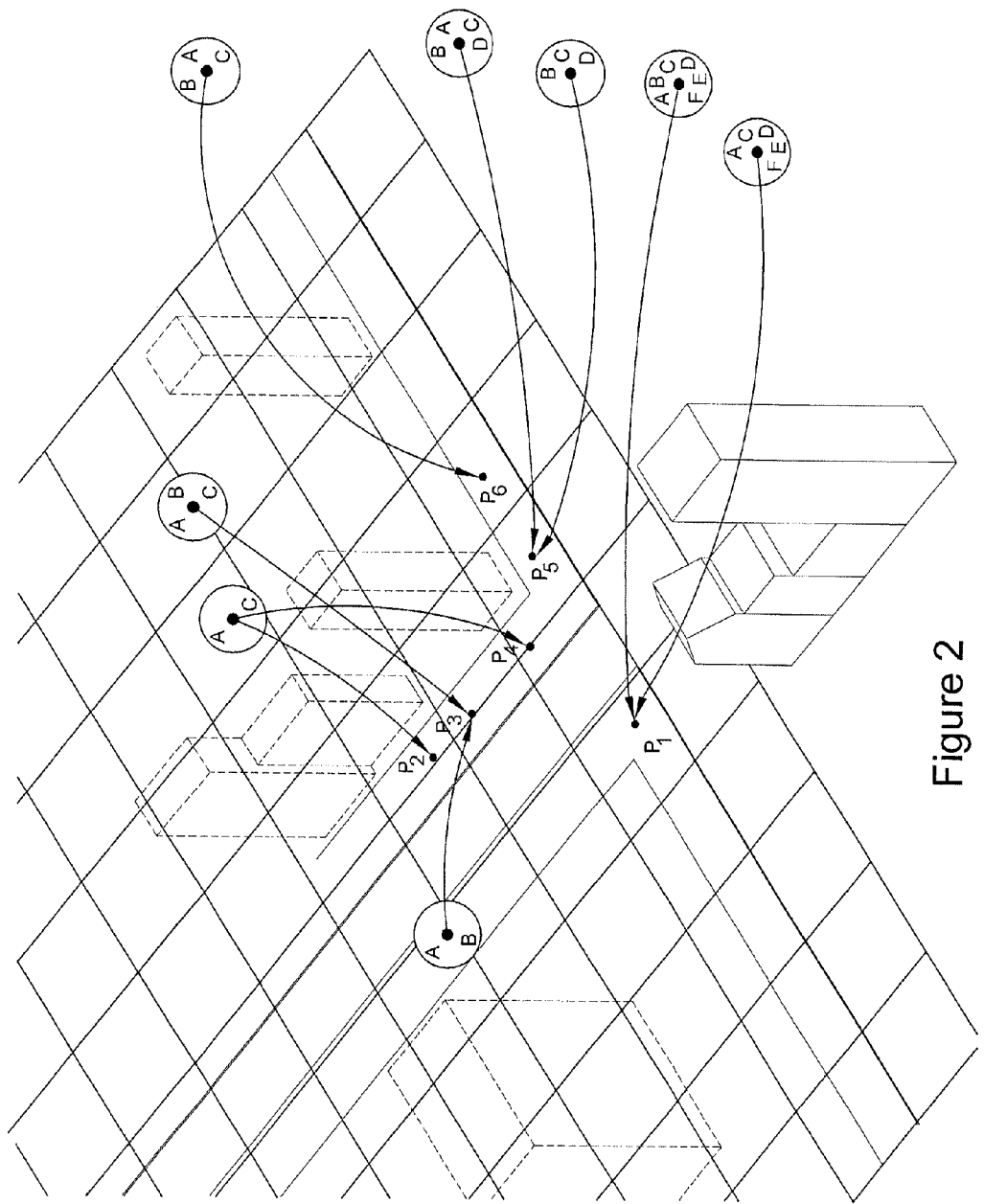
FIG. 2 is a pictorial representation of another embodiment of the present subject matter.

FIG. 2 is a pictorial representation of another embodiment of the present subject matter. With reference to FIG. 2, formation of clusters and subsequent mapping are pictorially illustrated. The environment 100 in FIG. 2 is the same as depicted in FIG. 1; however, it should be noted that, using embodiments of the present subject matter described herein, there are multiple clusters in observation space that may map to nearly the same points in location space. For example, P2 and P4 appear to share observation cluster {A, C}. This is noted simply for illustrational purposes, that is, embodiments of the present subject matter do not map observation clusters to location points during clustering processing. Rather, mapping may be required after a candidate NMR is clustered a second time (re-clustered) or a first time with the selected set of calibration data. That is, when an appropriate location for a candidate NMR is determined, then the mapping of a cluster to location space may be performed.

Figure 3:
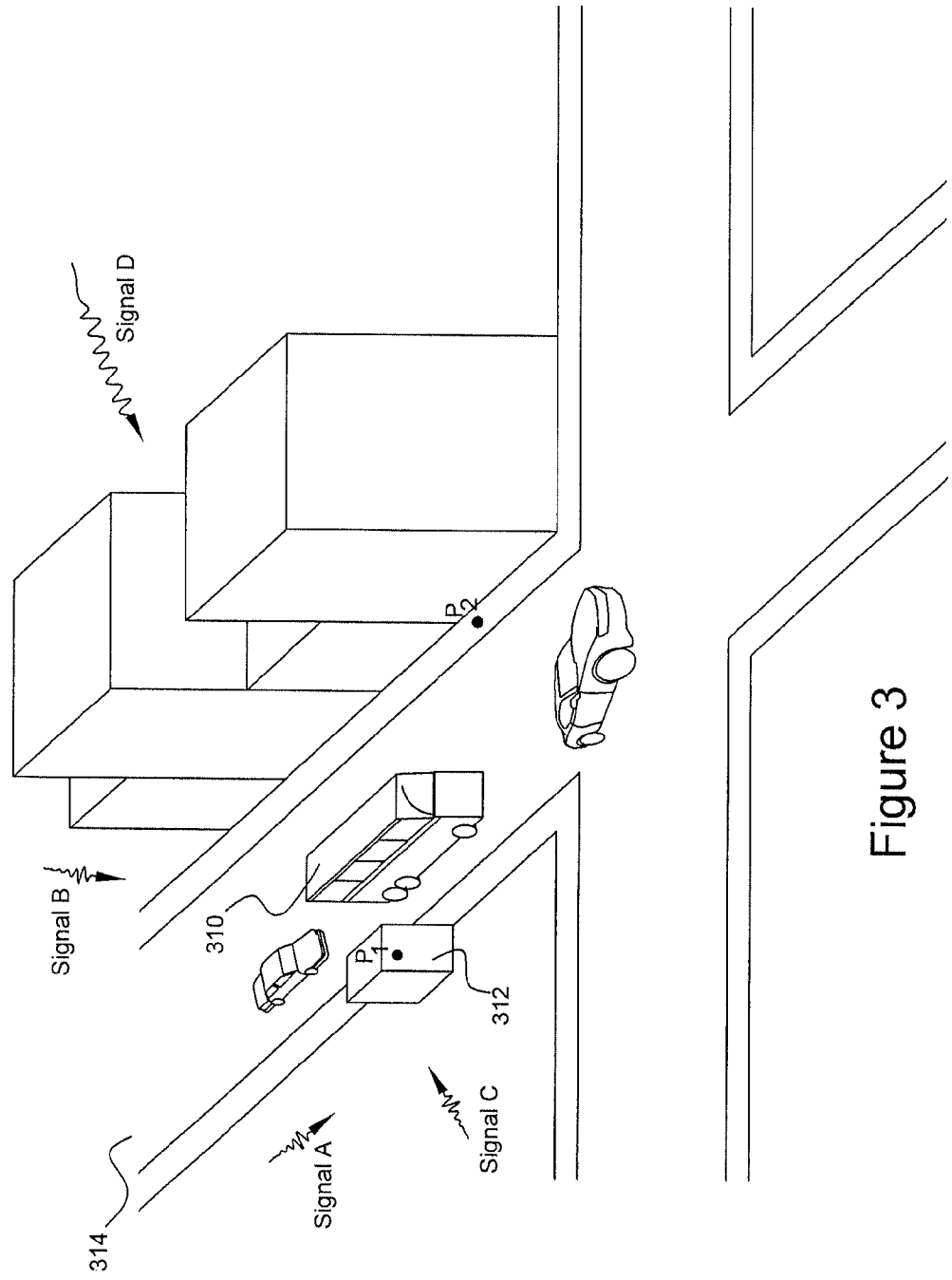
FIG. 3 is a pictorial representation of a further embodiment of the present subject matter.

FIG. 3 is a pictorial representation of a further embodiment of the present subject matter. With reference to FIG. 3, environmental perturbations in observation space are illustrated such as the passage of a large object 310 (e.g., a bus or truck) which results in a change in observed signals at P1 and P2. Thus, at P1, when no large object 310 is in front of the bus stop 312, an observer may have visibility to signals A, B, C and D. Further, at P2 an observer may have visibility to signals A, B and C. As the bus 310 moves down the street 314, an observer at P1 may lose signal D due to blockage from the bus 310. An observer at P2, however, may in this instance receive signal D due to a reflection of signal D off the bus 310. In this instance, the dynamic external environment would normally make it impossible to associate a particular static vector of observations with either of P1 or P2. Embodiments of the present subject matter, however, may capture the variability of signals in this environment by constructing clusters in observation space whereby such clusters are not limited geographically as depicted in FIG. 2. It should be noted, however, that any significant variation in a signal may be sufficient to generate a new measurement cluster. For example, a variation in the strength of signal D may be sufficient to generate multiple observation clusters associated with P1 and/or P2.

Figure 4:
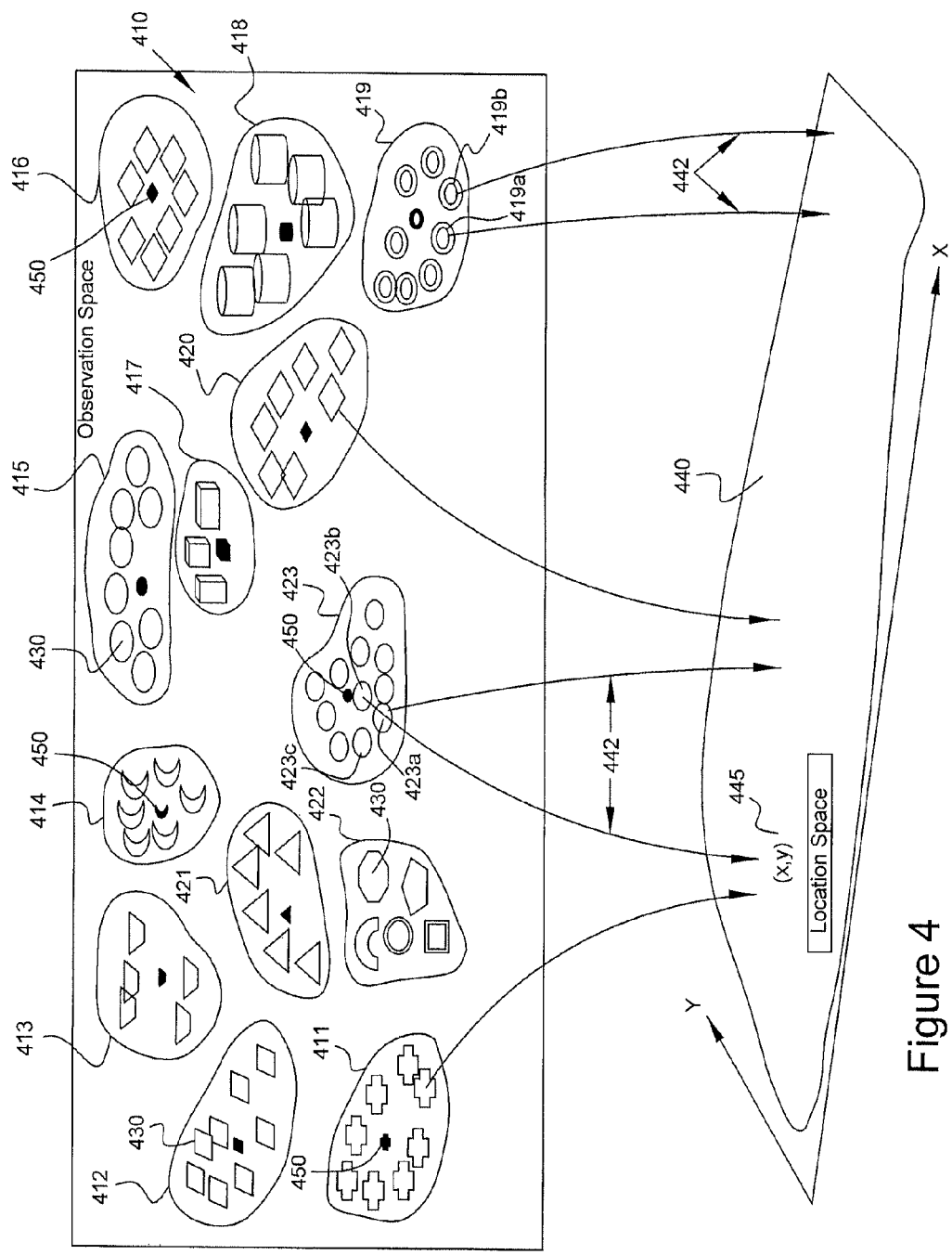
FIG. 4 is a pictorial representation of an additional embodiment of the present subject matter.

FIG. 4 is a pictorial representation of an additional embodiment of the present subject matter. With reference to FIG. 4, one exemplary location determination process 400 is visually depicted through an illustration of an observation space 410 having a plurality of observation clusters 411-423 after an exemplary clustering process (e.g., first and/or second level clustering). It should be noted that the observation space 410 may be multi-dimensional and hence this two dimensional depiction should not so limit the scope of the claims appended herewith as the depiction is merely an attempt at a visual representation of concepts contained in this disclosure. Objects 430 inside each cluster 411-423 possess similar shapes to depict measurement vector similarities to each other which permitted the formation of the clusters 411-423. An outlier set or cluster 422 is illustrated having dissimilar objects therein. The location space 440 is illustrated as a rectangular region having x, y coordinates. Again, while a two-dimensional space is used to illustrate the concept, such a depiction should not so limit the scope of the claims appended herewith. The location space 440 generally represents the space of all possible (x, y) location pairs. It should be noted, for example, that members 419$a$, 419$b$, 423$a$, 423$b$ in observation clusters 419, 423 may map to geographically distinct locations in location space 440. This mapping is illustrated by directional arrows 442 emanating from the respective observation clusters 419, 423 and terminating in the location space 440. Of course, any number of members in the observation clusters 411-423 may map to the location space and this example should not so limit the scope of the claims appended herewith. Further, each of the observation clusters 411-423 include a cluster center 450 which provides a representative vector or point in observation space 410 that captures the properties of the respective cluster 411-423. Of course, a centroid may be an exemplary but non-limiting example of such a center 450.

After an exemplary clustering process according to embodiments of the present subject matter, one of the observation clusters 423 may contain the candidate NMR 423$c$ or $C_u$. The cluster center 450 of the cluster 423 may then be examined. It should be noted, however, that the cluster center 450 is not necessarily coincident with any particular calibration NMR but is generally a point in observation space 410. A location may then be assigned to the candidate NMR 423$c$ by selecting an NMR 423$b$ in the cluster 423 which is closest to the cluster center 450 or centroid in observation space 410. Viewing the location space 440 and using the corresponding location space information 445 for the selected NMR 423$b$, an estimated location 445 may be assigned to the candidate NMR 423$c$ or $C_u$. Of course, other methods of assigning a location may be based upon various operations applied to the members of the cluster 423 and/or by any of the related methods discussed in this disclosure.

Figure 5:
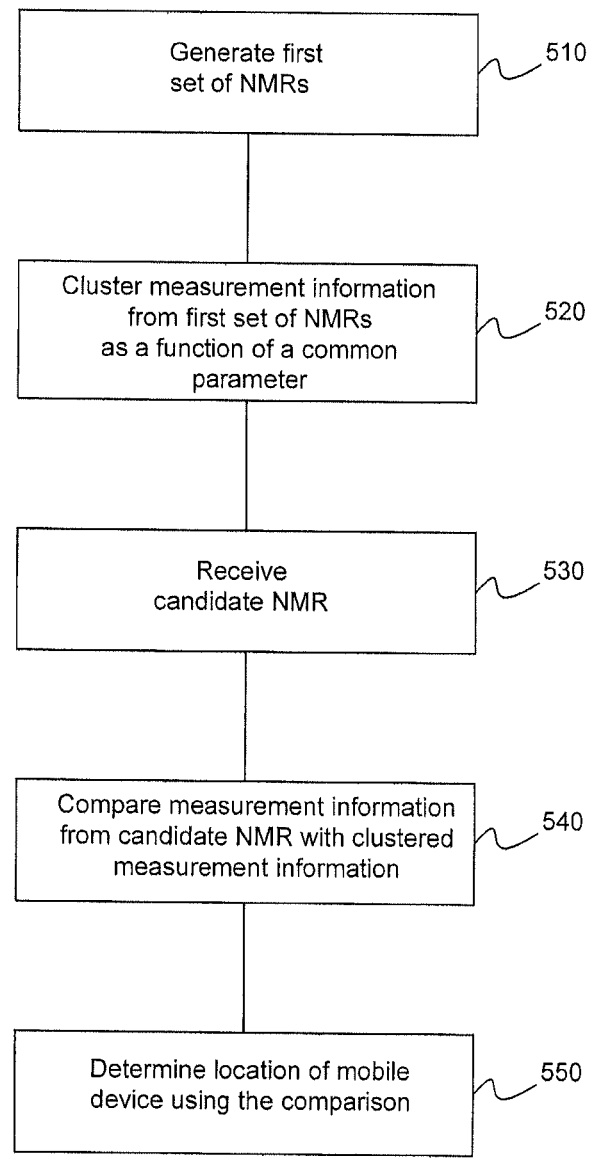
FIG. 5 is a block diagram of one embodiment of the present subject matter.

FIG. 5 is a block diagram of one embodiment of the present subject matter. With reference to FIG. 5, a method 500 for determining the location of a mobile device in a communications network is provided. At step 510, a first set of NMRs may be generated for a region in the communications network. Exemplary NMRs may be, but are not limited to, a collection of measurement parameters observed at a geographic location in the communications network. Such measurement parameters may include, for example, power levels, power differences, functions defined by power levels, functions defined by power differences, serving cell, serving sector, Timing Advance, Timing Advance equivalent, an ordered list of signal sources, round trip time, time difference of arrival, power density function of power levels, joint power density function of power levels, mobile device orientation, network state reported by the network, network state determined by an observing device, and combinations thereof. Further, the NMR may represent a single vector of observed measurement information, multiple vectors of observed measurement information, or a single vector representing multiple vectors of observed measurement information. In one embodiment, the method 500 may further include collecting calibration data from drive testing to thereby obtain an NMR and/or may include collecting calibration data from mobile devices in active communication in the communications network to thereby obtain an NMR.

Measurement information from the first set of NMRs may be clustered at step 520 as a function of a common parameter of the measurement information. The common parameter generally may be a measure representing a commonality between measurement information of NMRs in the first set. In one embodiment, the common parameter may be determined as a function of the following relationship: $d_{L1}^2(i,j)=d_O(i,j)*d_{NS}(i,j)*(d_{RCV}^2(i,j)+d_{DIV}^2(i,j))$ where i and j each represent an NMR, $d_O(i,j)$ represents a function comparing the observed measurements for ordered lists, $d_{NS}(i,j)$ represents a function comparing network states, $d_{RCV}^2(i,j)$ represents a function comparing real continuous variables, and $d_{DIV}^2(i,j)$ represents a function comparing discrete integer variables. In one embodiment, step 520 may include taking available measurement information from the first set of NMRs and providing a set of measurement information clusters based on common parameters in observation space. In a further embodiment, step 520 may include selecting an arbitrary NMR from the first set of NMRs and extracting NMRs from the first set having a common parameter with the arbitrary NMR. A subset of NMRs may be generated which includes the extracted NMRs and the arbitrary NMR. In this embodiment, if the subset of NMRs is less than a predetermined threshold, then the aforementioned steps may be iterated until the threshold is met. If, however, the subset of NMRs meets the predetermined threshold, then a focus of the subset of NMRs may be determined in observation space.

A candidate NMR for a mobile device may be received at step 530, and at step 540 measurement information from the candidate NMR compared with the clustered measurement information from the first set of NMRs. In one embodiment, step 540 may include assigning windows for each parameter type in the clustered measurement information and comparing measurement information from the candidate NMR with the clustered measurement information from the first set of NMRs using assigned windows of the corresponding parameter type. In this embodiment, if the compared measurement information from the candidate NMR does not substantially correspond with a respective window, then the respective window may be adjusted until the compared measurement information from the candidate NMR substantially corresponds. This measurement information may then be re-clustered to form a second set of NMRs. In this embodiment, if the compared measurement information from the candidate NMR substantially corresponds with a respective window, however, then a location of the mobile device may be determined as a function of the compared measurement information. One exemplary method or process of re-clustering may include extracting measurement information from the second set of NMRs (the second set comprising at least the candidate NMR and NMRs from the first set) and selecting an arbitrary NMR from the second set of NMRs. In this re-clustering NMRs from the second set having a common parameter with the arbitrary NMR may be extracted, and a subset of NMRs generated which includes the extracted NMRs and the arbitrary NMR. In this embodiment, if the subset of NMRs is less than a second threshold, then the previous steps should be iterated until the second threshold is met; however, if the subset of NMRs meets the second threshold, then a focus of the subset of NMRs in observation space may be determined.

At step 550, a location of the mobile device may then be determined as a function of the compared measurement information. In one embodiment, the determined location may be a location corresponding to a centroid of the clustered measurement information or may be a location corresponding to the closest NMR to a centroid of the clustered measurement information. In another embodiment, the method 500 may include the step of re-clustering the compared measurement information using a second set of NMRs, the second set comprising at least the candidate NMR and NMRs from the first set.

Figure 6:
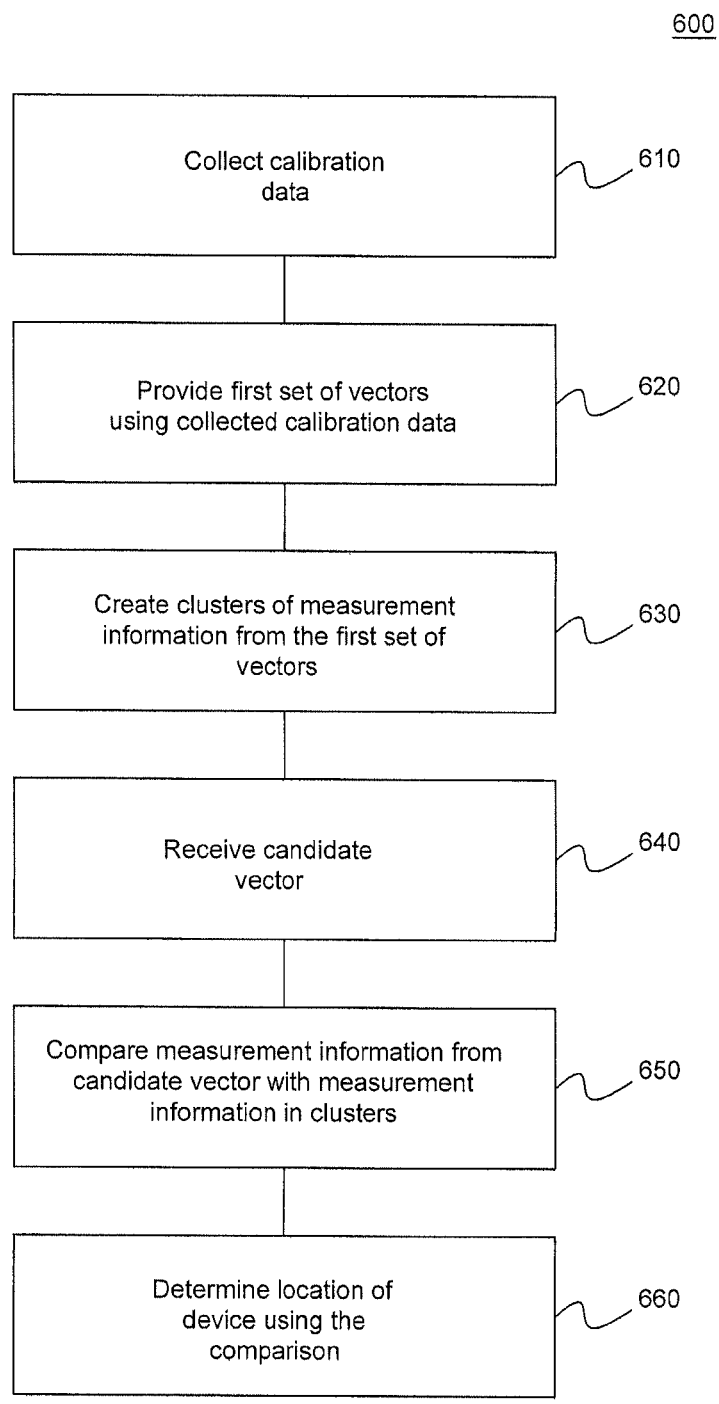
FIG. 6 is a block diagram of another embodiment of the present subject matter.

FIG. 6 is a block diagram of another embodiment of the present subject matter. With reference to FIG. 6, a method 600 is provided for determining the location of a mobile device in a communications network. At step 610, calibration data may be collected for a region in a communications network, and a first set of measurement vectors in observation space provided using the collected calibration data at step 620. At step 630, available measurement information from the first set of vectors may be selected to create clusters based on a common parameter in observation space. In one embodiment, step 630 may include selecting a random vector from the set of vectors and extracting vectors from the set having a common parameter with the random vector. In this embodiment, a cluster of vectors may be generated which includes the extracted vectors and the arbitrary vector. An exemplary common parameter may be, but is not limited to, a measure representing a commonality between measurement information of vectors in the set. Another exemplary common parameter may be determined as a function of the following relationship: $d_{L1}^2(i,j)=d_O(i,j)*d_{NS}(i,j)*(d_{RCV}^2(i,j)+d_{DIV}^2(i,j))$ where i and j each represent an NMR, $d_O(i,j)$ represents a function comparing the observed measurements for ordered lists, $d_{NS}(i,j)$ represents a function comparing network states, $d_{RCV}^2(i,j)$ represents a function comparing real continuous variables, and $d_{DIV}^2(i,j)$ represents a function comparing discrete integer variables. Upon receipt of a candidate measurement vector for a mobile device at step 640, measurement information from the candidate vector may be compared with the measurement information from the created clusters at step 650. In one embodiment, step 650 may include associating the candidate vector with a selected cluster of vectors and clustering the candidate vector and a second set of vectors whereby the vectors in the second set are associated with the selected cluster. At step 660, a location of the mobile device may be determined as a function of the compared measurement information.

Figure 7:
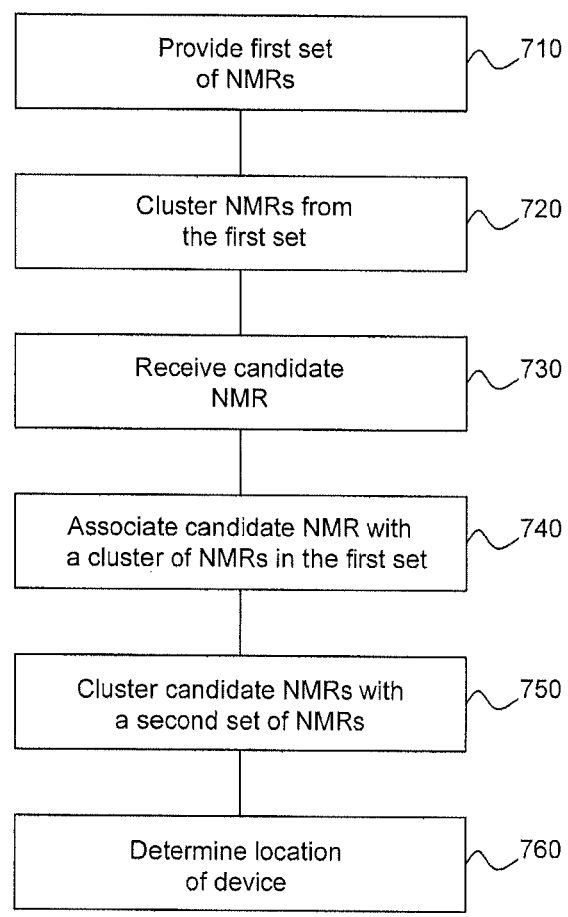
FIG. 7 is a block diagram of a further embodiment of the present subject matter.

FIG. 7 is a block diagram of a further embodiment of the present subject matter. With reference to FIG. 7, a method 700 for determining the location of a mobile device in a communications network is provided. At step 710, a set of NMRs for a region in the network may be provided. NMRs in this first set may then be clustered at step 720 as a function of observed measurement information in the NMRs. In one embodiment, step 720 may include selecting a random NMR from the first set of NMRs and extracting NMRs from the first set having a common parameter with the random NMR. In this embodiment, a cluster of NMRs may be generated which includes the extracted NMRs and the arbitrary NMR. An exemplary but non-limiting common parameter may be determined as a function of the following relationship: $d_{L1}^2(i,j)=d_O(i,j)*d_{NS}(i,j)*(d_{RCV}^2(i,j)+d_{DIV}^2(i,j))$ where i and j each represent an NMR, $d_O(i,j)$ represents a function comparing the observed measurements for ordered lists, $d_{NS}(i,j)$ represents a function comparing network states, $d_{RCV}^2(i,j)$ represents a function comparing real continuous variables, and $d_{DIV}^2(i,j)$ represents a function comparing discrete integer variables. Upon receipt of a candidate NMR for a mobile device at step 730, the candidate NMR may be associated with a selected cluster of NMRs at step 740. The candidate NMR and a second set of NMRs may then be clustered at step 750, and a location of the mobile device determined at step 760 as a function of the clustered candidate NMR and second set of NMRs whereby the NMRs in the second set are associated with the selected cluster. In one embodiment, the determined location may be a function of a centroid of the clustered candidate NMR and second set of NMRs or may be the closest NMR to a centroid of the clustered candidate NMR and second set of NMRs.

It should be noted that the proximity described herein is measured in observation space rather than in location space. That is, the candidate NMR(s) do not include location information but include observation information. Thus, exemplary clustering operations are performed in observation space, and proximity noted in observation space. For example, if a centroid in observation space has been determined, one option would be to select the closest calibration NMR to the centroid (most proximate in observation space), and then assign location information for this calibration data NMR as the estimated location. This may generally be defined as a dynamic aspect of the claimed subject matter as the clusters do not remain static, but are rather influenced by the specific observation information contained in the candidate NMR(s). Solely for clarification purposes, a static scheme may be represented in an instance having some pre-calculated clusters in observation space. When a candidate NMR needs to be located, one would select the closest cluster in observation space and simply use a function of the location information available for the cluster members to assign a location. This assigned location may thus be a function only of the pre-calculated clusters. In a dynamic scheme, however, proximate clusters are determined and may be re-clustered with candidate NMRs with subsequent location assignment. This assigned location may thus be dependent upon which NMRs are in the closest clusters and observation information in the candidate NMR(s). In the dynamic scheme, it follows that even if matching clusters may remain the same, an assigned location may change depending on the specific observation information in the candidate NMR(s).

Figure 8:
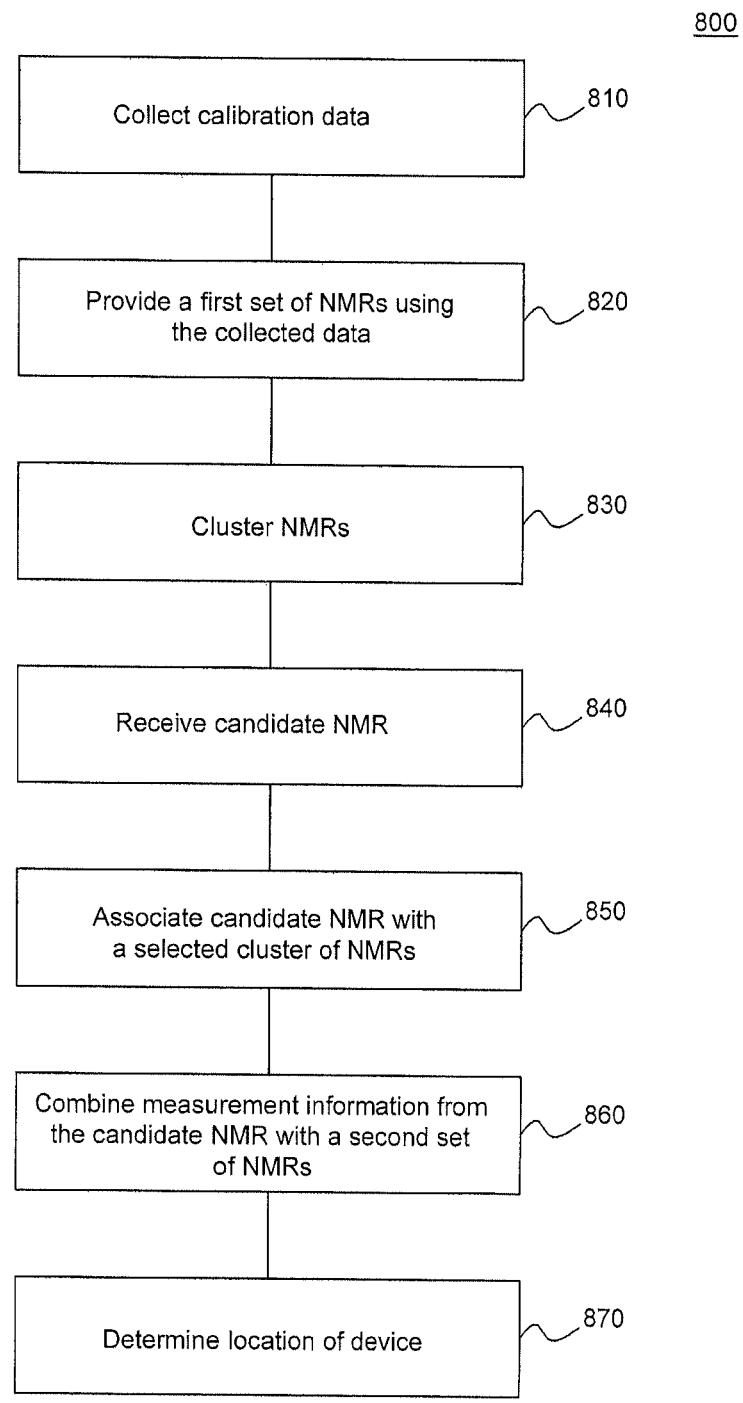
FIG. 8 is a block diagram of an additional embodiment of the present subject matter.

FIG. 8 is a block diagram of an additional embodiment of the present subject matter. With reference to FIG. 8, a method 800 for determining the location of a mobile device in a communications network is provided. The method 800 may include at step 810 collecting calibration data for a region in the network and providing a set of NMRs using the collected calibration data at step 820, each NMR having measurement information. At step 830, NMRs in the set may be clustered without regard to the location where the measurement information was obtained. Upon receipt of a candidate NMR for a target mobile device at step 840, the candidate NMR may be associated with a selected cluster of NMRs at step 850 and measurement information from the candidate NMR combined with a second set of NMRs at step 860. A location of the mobile device in the region may then be determined at step 870 as a function of the combined candidate NMR and second set of NMRs. In one embodiment, the determined location may be a centroid of the combined measurement information or may be the closest NMR to a centroid of the combined measurement information.

The present disclosure may be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As shown by the various configurations and embodiments illustrated in FIGS. 1-8, a method and system for determining the location of a mobile device by dynamic clustering have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method of determining the geolocation of a mobile device operating in a region served by a communications network, the method comprising the steps of:
   (a) determining an observation cluster of measurement data from a first set of network measurement reports ("NMRs") from the communication network;
   (b) comparing measurement data from a candidate NMR for a mobile device with the determined observation cluster of measurement data and
   (c) determining a location of the mobile device as a function of the comparison,
   wherein the observation cluster is determined as a function of a common parameter of the measurement data in observation space, and
   wherein the common parameter is determined as a function of the following relationship:

$$d_{L1}^2(i,j)=d_O(i,j)*d_{NS}(i,j)*(d_{RCV}^2(i,j)+d_{DIV}^2(i,j))$$

where i and j each represent an NMR, $d_O(i,j)$ represents a function comparing the observed measurements for ordered lists, $d_{NS}(i,j)$ represents a function comparing network states, $d_{RCV}^2(i,j)$ represents a function comparing real continuous variables, and $d_{DIV}^2(i,j)$ represents a function comparing discrete integer variables.

2. A method of determining the geolocation of a mobile device operating in a region served by a communications network, the method comprising the steps of:
   (a) determining an observation cluster of measurement data from a first set of network measurement reports ("NMRs") from the communication network;
   (b) comparing measurement data from a candidate NMR for a mobile device with the determined observation cluster of measurement data; and
   (c) determining a location of the mobile device as a function of the comparison, wherein the step of determining an observation cluster further comprises the steps of:
(i) selecting an arbitrary NMR from the first set of NMRs;
(ii) extracting NMRs from the first set of NMRs having a common parameter with the arbitrary NMR;
(iii) generating a subset of NMRs including the extracted NMRs and the arbitrary NMR;
(iv) if the subset of NMRs contains fewer NMRs than a predetermined threshold, then iterating steps (i)-(iii) until the threshold is met; and
(v) if the subset of NMRs meets the predetermined threshold, then determining a focus of the subset of NMRs in observation space.

3. The method of claim 2 wherein the location is determined by:
(a) determining a centroid in observation space based on the measurement data from the set of NMRs from the communication network and based on the measurement data from the NMR for the mobile device;
(b) calculating, based on the determined centroid, a weight for each of select ones of the NMRs from the communication network and from the NMR for the mobile device;
(c) applying the calculated weight to a location for each of said select ones of the NMRs from the communication network; and
(d) calculating a weighted sum of the locations.

4. The method of claim 2 wherein ones of the NMRs in the first set of NMRs are measured at different geographic locations in the communications network.

5. The method of claim 2 wherein the measurement data includes data selected from the group consisting of power levels, power differences, functions defined by power levels, functions defined by power differences, serving cell, serving sector, Timing Advance, Timing Advance equivalent, an ordered list of signal sources, round trip time, time difference of arrival, power density function of power levels, joint power density function of power levels, mobile device orientation, network state reported by the network, network state determined by an observing device, and combinations thereof.

6. The method of claim 2 wherein the NMR represents a single vector of observed measurement information, multiple vectors of observed measurement information, or a single vector representing multiple vectors of observed measurement information.

7. The method of claim 2 wherein the step of comparing measurement data comprises:
(A) assigning windows for each parameter type in the determined observation cluster of measurement data;
(B) comparing the measurement data from the candidate NMR with the determined observation of clustered measurement data from the subset of NMRs using a first of the assigned windows;
(C) if the comparison in step (B) indicates that the measurement data from the candidate NMR does not substantially correspond with the clustered measurement data from the subset of NMRs using the first a window, then adjusting the first window until the measurement data from the candidate NMR substantially corresponds with the clustered measurement data from the subset of NMRs using the first window, and clustering measurement data from a second set of NMRs; and
(D) if the comparison in step (B) indicates that the measurement data from the candidate NMR substantially corresponds with the clustered measurement data from the subset of NMRs using the first window, then determining a location of the mobile device as a function of the location corresponding to the comparison in step (B).

8. The method of claim 7 wherein the clustering of measurement data from the second set of NMRs comprises:
(i) extracting measurement information from the second set of NMRs, the second set of NMRs comprising at least the candidate NMR and NMRs from the subset of NMRs or from the first set of NMRs;
(ii) selecting an arbitrary NMR from the second set of NMRs;
(iii) extracting NMRs from the second set of NMRs having a common parameter with the arbitrary NMR;
(iv) generating a second subset of NMRs including the extracted NMRs from the second set of NMRs and the arbitrary NMR;
(v) if the second subset of NMRs contains fewer NMRs than a second threshold, then iterating steps (ii)-(iv) until the second threshold is met; and
(vi) if the second subset of NMRs meets the second threshold, then determining a focus of the second subset of NMRs in observation space.

9. The method of claim 2 further comprising the step of determining a second observation cluster using a second set of NMRs, wherein the second set of NMRs includes at least the candidate NMR and NMRs from the first set.

10. A method of determining the geolocation of a mobile device operating in a region served by a communications network, the method comprising the steps of:
(a) determining an observation cluster of measurement data from a first set of network measurement reports ("NMRs") from the communication network;
(b) comparing measurement data from a candidate NMR for a mobile device with the determined observation cluster of measurement data; and
(c) determining a location of the mobile device as a function of the comparison,
wherein the step of comparing measurement data comprises:
(i) assigning windows for each parameter type in the determined observation cluster of measurement data;
(ii) comparing the measurement data from the candidate NMR with the determined observation cluster of measurement data from the first set of NMRs using a first of the assigned windows;
(iii) if the comparison in step (ii) indicates that the measurement data from the candidate NMR does not substantially correspond with the clustered measurement data from the first set of NMRs using the first window, then adjusting the first window until the measurement data from the candidate NMR substantially corresponds with the clustered measurement data from the first set of NMRs using the first window, and clustering measurement data from a second set of NMRs; and
(iv) if the comparison in step (ii) indicates that the measurement data from the candidate NMR substantially corresponds with the clustered measurement data from the first set of NMRs using the first window, then determining a location of the mobile device as a function of the location corresponding to the comparison in step (ii).

11. The method of claim 10 wherein the clustering of measurement data from the second set of NMRs comprises:
(i) extracting measurement information from the second set of NMRs, the second set of NMRs comprising at least the candidate NMR and NMRs from the first set of NMRs;

(ii) selecting an arbitrary NMR from the second set of NMRs;

(iii) extracting NMRs from the second set of NMRs having a common parameter with the arbitrary NMR;

(iv) generating a subset of NMRs including the extracted NMRs from the second set of NMRs and the arbitrary NMR;

(v) if the subset of NMRs contains fewer NMRs than a predetermined threshold, then iterating steps (ii)-(iv) until the predetermined threshold is met; and (vi) if the subset of NMRs meets the predetermined threshold, then determining a focus of the subset of NMRs in observation space.

12. In a method for determining the location of a mobile device in a communications network comprising collecting calibration data having measurement information for a region in the network, the improvement comprising determining one or more clusters of measurement information from the calibration data without regard to the location where the measurement information was obtained, receiving a measurement vector for a target mobile device, comparing the measurement vector with the one or more clusters of measurement information, combining the measurement vector with a select cluster of the measurement information, and determining a location of the mobile device in the region as a function of a location corresponding to the combined measurement information.

13. The method of claim 12 wherein the location is determined as a function of a location corresponding to the combined measurement information.

14. The method of claim 12 wherein the location is determined by:

(a) determining a centroid in observation space based on the measurement data from the set of NMRs from the communication network and based on the measurement data from the NMR for the mobile device;

(b) calculating, based on the determined centroid, a weight for each of select ones of the NMRs from the communication network and from the NMR for the mobile device;

(c) applying the calculated weight to a location for each of said select ones of the NMRs from the communication network; and (d) calculating a weighted sum of the locations.

15. The method of claim 12 wherein a first subset of the calibration data is measured at a different geographic location than a second subset of the calibration data.

16. The method of claim 12 wherein the measurement information includes information selected from the group consisting of power levels, power differences, functions defined by power levels, functions defined by power differences, serving cell, serving sector, Timing Advance, Timing Advance equivalent, an ordered list of signal sources, round trip time, time difference of arrival, power density function of power levels, joint power density function of power levels, mobile device orientation, network state reported by the network, network state determined by an observing device, and combinations thereof.

17. The method of claim 12 wherein the calibration data represents a single vector of observed measurement information, multiple vectors of observed measurement information, or a single vector representing multiple vectors of observed measurement information.

* * * * *